US008294722B2

(12) United States Patent
Hong et al.

(10) Patent No.: US 8,294,722 B2
(45) Date of Patent: Oct. 23, 2012

(54) INTERFACE APPARATUS AND METHOD

(75) Inventors: Han Young Hong, Suwon-si (KR); Hyun Ha Hwang, Gangnam-gu (KR)

(73) Assignee: LG Display Co., Ltd., Seoul (KR)

( * ) Notice: Subject to any disclaimer, the term of this patent is extended or adjusted under 35 U.S.C. 154(b) by 777 days.

(21) Appl. No.: 12/093,280

(22) PCT Filed: Nov. 13, 2006

(86) PCT No.: PCT/KR2006/004735

§ 371 (c)(1), (2), (4) Date: May 9, 2008

(87) PCT Pub. No.: WO2007/055543

PCT Pub. Date: May 18, 2007

(65) Prior Publication Data

US 2008/0266221 A1 Oct. 30, 2008

(30) Foreign Application Priority Data

Nov. 11, 2005 (KR) ........................ 10-2005-0107921

(51) Int. Cl.

| | |
|---|---|
| ***G06F 13/14*** | (2006.01) |
| ***G06F 15/80*** | (2006.01) |
| ***G06F 1/00*** | (2006.01) |
| ***G06F 1/32*** | (2006.01) |
| ***G06F 1/04*** | (2006.01) |
| ***G06F 1/14*** | (2006.01) |
| ***G06F 1/24*** | (2006.01) |
| ***G06F 11/00*** | (2006.01) |

(52) U.S. Cl. ........ 345/520; 345/504; 713/300; 713/320; 713/501; 713/502; 713/503

(58) Field of Classification Search .................... 345/87, 345/504, 520

See application file for complete search history.

(56) References Cited

U.S. PATENT DOCUMENTS

| | | | | |
|---|---|---|---|---|
| 6,856,268 | B2 * | 2/2005 | Choi | 341/144 |
| 7,080,266 | B2 * | 7/2006 | D'Angelo et al. | 713/300 |
| 7,426,613 | B2 * | 9/2008 | Booth et al. | 711/150 |
| 7,606,955 | B1 * | 10/2009 | Falik et al. | 710/110 |
| 2003/0188202 | A1 * | 10/2003 | D'Angelo et al. | 713/300 |
| 2004/0036428 | A1 * | 2/2004 | Bui et al. | 318/254 |

FOREIGN PATENT DOCUMENTS

| | | |
|---|---|---|
| JP | 5158586 A | 6/1993 |

* cited by examiner

*Primary Examiner* — Alexander S Beck
*Assistant Examiner* — Tony N Ngo
(74) *Attorney, Agent, or Firm* — Birch, Stewart, Kolasch & Birch, LLP

(57) ABSTRACT

An interface apparatus and method are provided. The interface apparatus includes a level detecting unit detecting a level of an inputted control signal, a counter unit increasing or decreasing a count value according to the level detected in the level detecting unit, and a driving control unit outputting a driving control information mapped into a count value of the counter unit.

18 Claims, 3 Drawing Sheets

[Fig. 1]
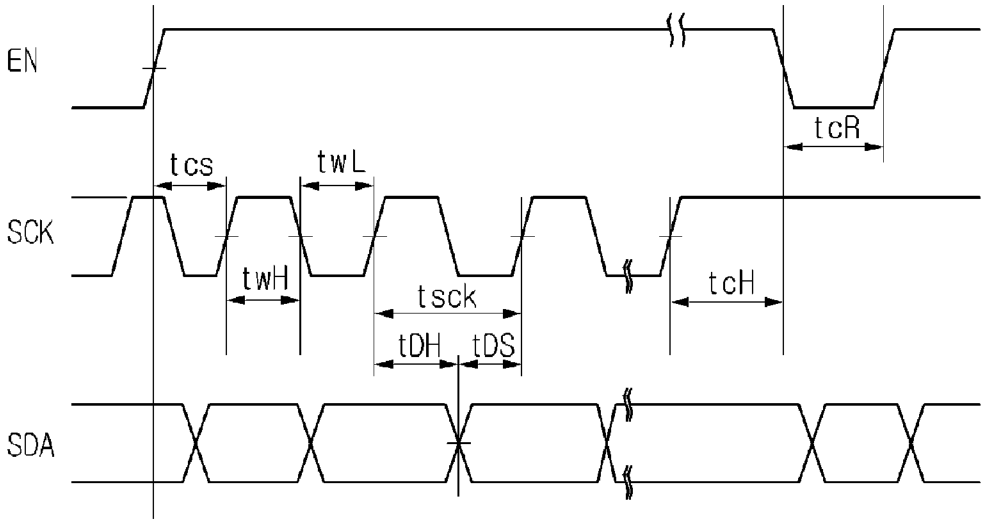
[Fig. 2]
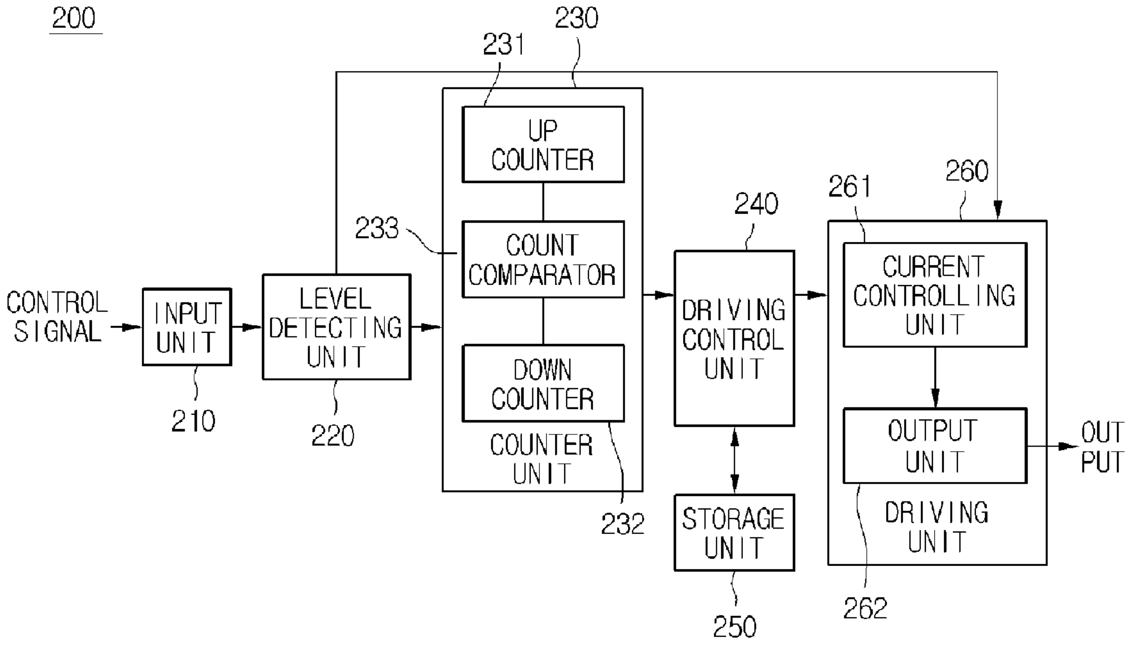
[Fig. 3]
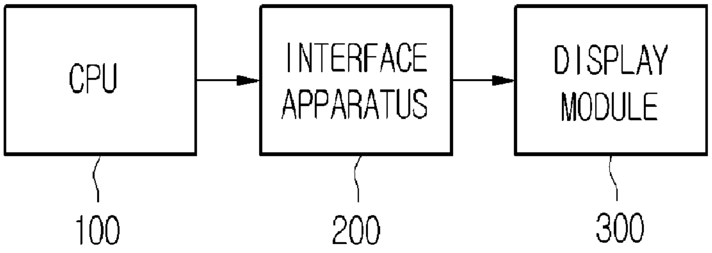

[Fig. 4]
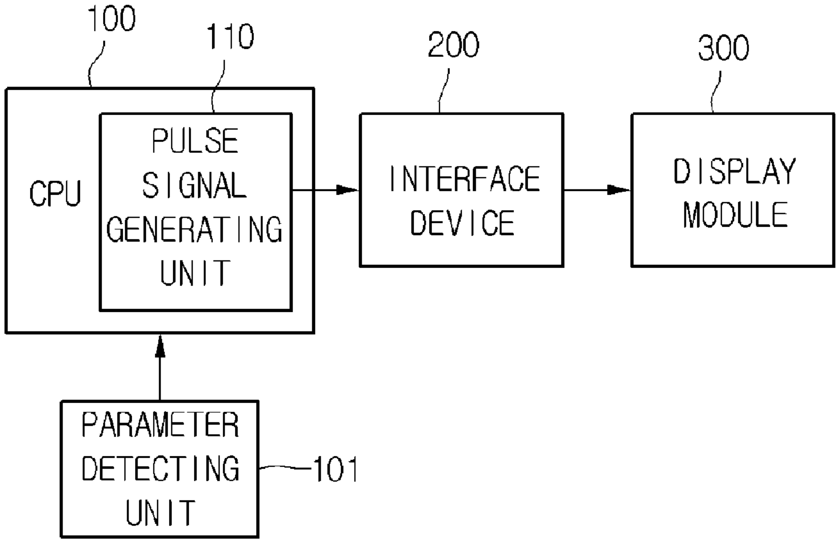
[Fig. 5]
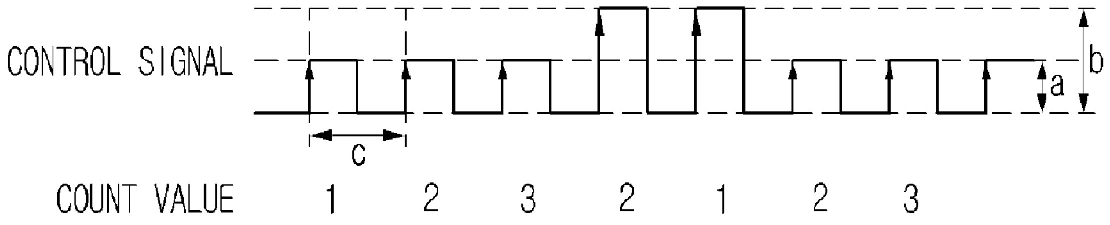
[Fig. 6]
| COUNT VALUE | ADDRESS | DRIVING STATE INFORMATION |
|---|---|---|
| 1 | 001 | 10110110 |
| 2 | 010 | 10001001 |
| 3 | 011 | 11001000 |
| | | ⋮ |

[Fig. 7]
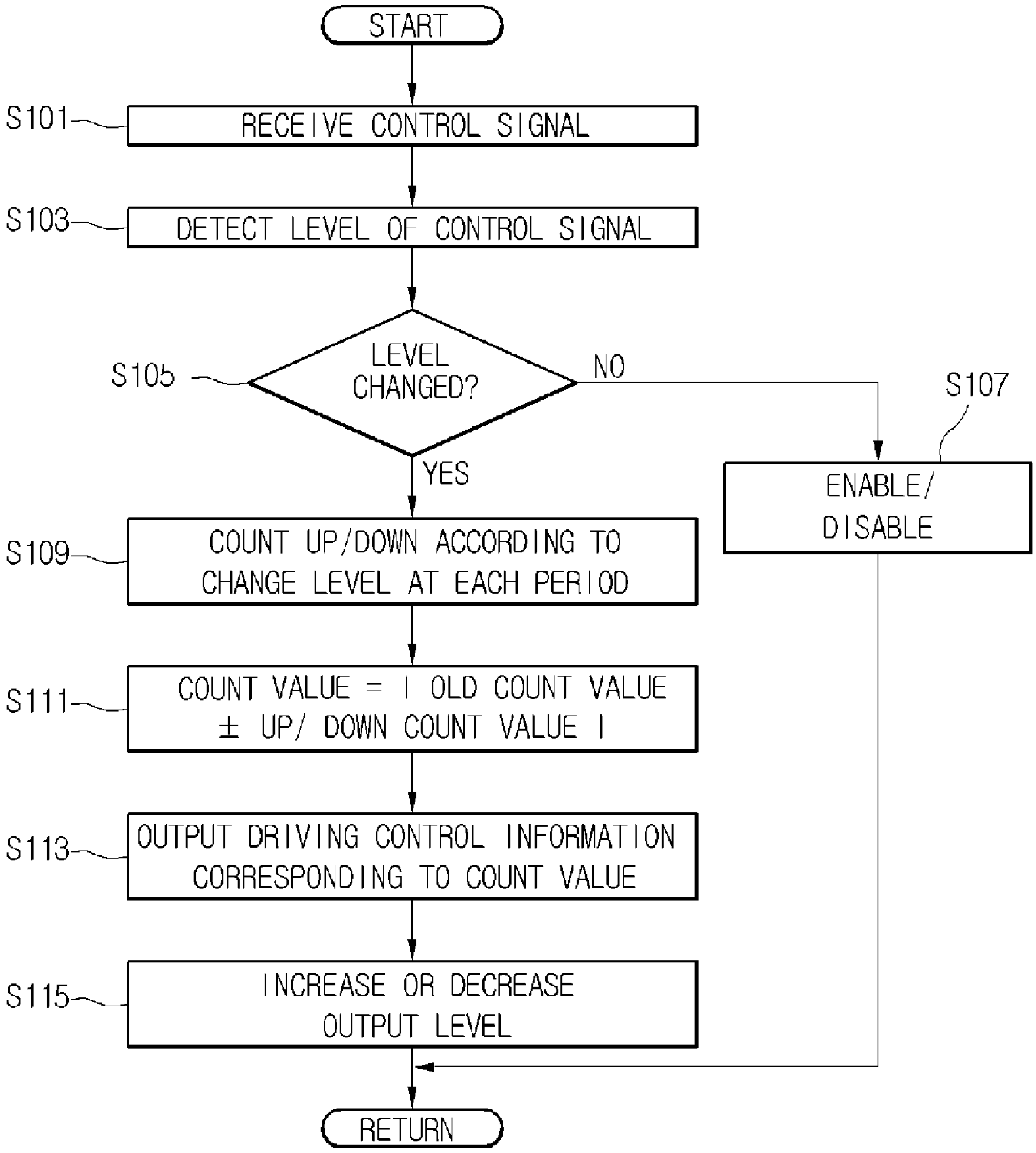

INTERFACE APPARATUS AND METHOD

CROSS-REFERENCE TO RELATED APPLICATION

This application is the U.S. national stage application of International Patent Application No. PCT/KR2006/004735, filed Nov. 13, 2006, the disclosure of which is hereby incorporated by reference in its entirety.

TECHNICAL FIELD

The present invention relates to a single line interface apparatus and method.

BACKGROUND ART

Multimedia playing devices are rapidly being miniaturized for portability. For example, mobile communication terminals having a multimedia playing function are equipped with a high-quality display device. Moreover, miniaturization of each component related to a display function becomes a very important factor. There are various kinds of display products using a cathode ray tube (CRT), a liquid crystal display (LCD) device, a light emitting diode (LED), a field emission display (FED), an organic light emitting diode (OLED), etc.

A display module such as an LCD device requires LEDs for backlight and a device for driving the LEDs. Additionally, an interface circuit is provided between the device and control module to deliver a control signal of a control module into the device.

Since the interface circuit is controlled by three kinds of input signals, control operations of the control module are complex and the number of control pins is required according to the number of signals.

Accordingly, since the structure of the interface becomes more complex and larger, it is hard to reduce the size of a multimedia playing device, and also manufacturing cost increases.

FIG. 1 is a waveform diagram of a related art three-line interface.

As illustrated in FIG. 1, a three-line interface apparatus utilizes an enable EN signal, a serial clock SCK, and a serial data SDA signal.

This three-line interface apparatus can be realized with a chip. When eight SCKs are inputted into the three-line interface apparatus according to a predetermined signal input standard, data of SDA is analyzed in rising edges of each SCK to drive six LEDs constituting two groups.

Parameters used in digital signals will be defined in a following Table 1.

TABLE 1

| Parameter | Symbol |
|---|---|
| SCK clock cycle | $t_{SCK}$ |
| SCK high-level pulse width | $t_{WH}$ |
| SCK low-level pulse width | $t_{WL}$ |
| EN setup time | $t_{CS}$ |
| EN hold time | $t_{CH}$ |
| EN recovery time | $t_{CR}$ |
| Write data setup time | $t_{DS}$ |
| Write data hold time | $t_{DH}$ |

The EN signal has two signal states where a high level is a signal enabling an interface of an interface apparatus and a low level is a signal disabling an interface of an interface apparatus.

A voltage of when the EN signal is in a high level is generally in a TTL level. Although an input signal is applied to the interface apparatus, the interface apparatus stops data analysis operations when the EN signal is in a low level. Accordingly, when the EN signal is in a high level, output can be obtained according to an input signal.

SCK represents a data input period. Data of SDA is analyzed in rising edges of the SCKs. The SDA represents an inputted data signal. While the EN signal is inputted in a high level, a signal state is detected in rising edges of SCK signals.

In a related art three-line interface apparatus, since a driving state is controlled by three input lines that is divided according to the kinds of input signals, operational principle is complex, operations takes a long time, and the chip size increases.

DISCLOSURE OF INVENTION

Technical Problem

An embodiment of the present invention provides an interface apparatus and method.

An embodiment of the present invention provides a single line interface apparatus and method controlling a corresponding module by a control signal having three states of a level in a single line.

An embodiment of the present invention provides an interface apparatus and method performing an enable/disable, and a driving control of a corresponding module effectively by using a single line interface.

Technical Solution

An embodiment of the present invention provides an interface apparatus comprising: a level detecting unit detecting a level of an inputted control signal; a counter unit increasing or decreasing a count value according to the level detected in the level detecting unit; and a driving control unit outputting a driving control information mapped into a count value of the counter unit.

An embodiment of the present invention provides an interface method comprising: detecting a level of an inputted control signal; increasing or decreasing a count value according to a level of the detected control signal for outputting; and outputting as a driving control information of a corresponding module mapped into the outputted count value.

An embodiment of the present invention provides an interface method comprising: confirming a level state of a control signal inputted in a single line; enabling or disabling an apparatus when a level state of the control signal is a DC voltage; increasing a count value when a level state of the control signal is a first pulse, and decreasing a count value when a level state of the control signal is a second pulse; and outputting a driving control information mapped into the increased or decreased count value.

Advantageous Effects

According to the present invention, a structure of an interface apparatus following a transmission and process standard of a control signal can be simplified.

Complex control of a corresponding module can be performed by using a single line interface apparatus.

The single line interface apparatus effectively controls a corresponding module.

Additionally, since the interface apparatus can be connected in a single line, the number of input/output terminals can be reduced, and the size of the IC can be minimized.

BRIEF DESCRIPTION OF THE DRAWINGS

FIG. 1 is a waveform diagram of a related art three-line interface;

FIG. 2 is a block diagram of an interface apparatus according to an embodiment of the present invention;

FIG. 3 is a block diagram of a control system having the interface apparatus of FIG. 2;

FIG. 4 is another example of a CPU in the control system of FIG. 3;

FIG. 5 is a view of an up/down-counter example of an inputted pulse signal in an interface apparatus according to an embodiment of the present invention;

FIG. 6 is a table of a mapping example of a count value and a driving state information in an interface apparatus according to an embodiment of the present invention; and FIG. 7 is a flowchart illustrating an interface method according to an embodiment of the present invention.

BEST MODE FOR CARRYING OUT THE INVENTION

An interface apparatus will be described in more detail with reference to drawings.

FIG. 2 is a block diagram of an interface apparatus according to an embodiment of the present invention.

Referring to FIG. 2, an interface apparatus 200 includes an input unit 210, a level detecting unit 220, a counter unit 230, a driving control unit 240, a storage unit 250, and a driving unit 260.

The interface apparatus 200 controls enable/disable and an output level supplied to a corresponding module by using a level of a control signal inputted in a single line.

Here, the control signal is a signal having three states of a voltage level that is inputted in a predetermined DC level such as a low voltage, a middle voltage, and a high voltage, or in a pulse form having a level change during one period. The pulse form changes from a low voltage into a middle voltage or high voltage during one period.

The input unit 210 is an input pin or port that receives a control signal inputted through a single line, and then outputs the control signal into the level detecting unit 220.

The level detecting unit 220 detects a level of the control signal. At this point, when the level of the control signal is in a DC level, the control signal is outputted as an enable or disable signal. When the level of the control signal is a pulse in a square wave form, the control signal is outputted into the counter unit 230.

The level detecting unit 220 outputs a disable signal into the driving unit 260 when the detected DC level is a low voltage, and outputs an enable signal into the driving unit 260 when the detected DC level is a middle voltage or a high voltage. At this point, the driving unit 260 is disabled and an output is turned off when the disable signal is inputted. When an enable signal is inputted into the driving unit 260, the driving unit is enabled and an output is turned on.

The counter unit 230 includes an up-counter 231, a down-counter 232, and a count comparator 233. The counter unit 230 counts up or down according to a changing level during each period of a pulse.

The up-counter 231 increases a count value by one at each pulse (hereinafter, referred to as a "first pulse") that changes from a low voltage into a middle voltage during one period of a control signal. The down-counter 232 decreases a count value by one at each pulse (hereinafter, referred to as a "second pulse") that changes from a low voltage into a high voltage during one period of a control signal. The present invention can use one of the first pulse and the second pulse as an up-count, and the other as a down-count. Additionally, the time of counting may be a rising edge or a falling edge in each pulse.

Here, an up/down count operations of the counter unit 230 will be described with reference to FIG. 5. FIG. 5 is a waveform diagram of an up/down-count example according to an embodiment of the present invention. A count value increases by one when a control signal is a first pulse that changes from a low voltage into a middle voltage during one period c. A count value decreases by one when a control signal is a second pulse that changes from a low voltage into a high voltage b during one period. Accordingly, as illustrated in FIG. 5, when the first pulse is continuously inputted three times and the second pulse is continuously inputted two times, and the first pulse is continuously inputted two times, the count value is 3 (=3−2+2).

At this point, a control signal formed of the first pulse or the second pulse, or a control signal mixed with the first pulse and the second pulse can be inputted into a single line interface apparatus 200.

The count comparator 233 of the counter unit 230 receives a counted value from the up or/and down-counter 231 and 232, and compares the counted value with an old up/down count value. The comparison result is outputted into the driving control unit 240 as a final count value. At this point, the final count value corresponds to mapping data of the address.

That is, the count comparator 233 outputs an initial count value when a control signal is inputted for an initial driving. When a control signal other than an initial driving is inputted, the count comparator 233 subtracts an initial count value from a count value, and outputs a final count value corresponding to address mapping data. For example, when a value counted in a previous up-counter 231 is 50, and a value counted in a current down-counter 232 is 5, a final count value 45 is outputted by performing subtraction of two count values (50−5). Moreover, when a count value of a previous up count 231 is 50, and a count value of a current up-counter 231 is 5, a final count value 55 (=50+5) is outputted.

The count comparator 233 reflects a new up/down count value on a previous count value for outputting. Although each time a pulse of a signal corresponding to a count value is not inputted, an identical count value can be outputted. The count comparator 233 can be realized in the counter unit 230 or a driving control unit 240.

The driving control unit 240 searches a driving state information mapped into the count value in the storage unit 250 when a count value is inputted from the counter unit 230. That is, the driving control unit 240 can search the driving state information stored in the storage unit 250 by addressing the inputted count value and an address of the mapped storage unit 250.

Here, the storage unit 250 can be realized with a non-volatile memory such as electrically erasable programmable read-only memory (EEPROM) and flash memory. In the storage unit 250, as illustrated in FIG. 6, a count value, an address, and a driving state information are mapped in a look-up table. At this point, the mapping method includes a direct mapping method and an indirect mapping method.

The driving control unit 240 outputs the searched driving control information into the driving unit 260, and also controls an output level supplied into a corresponding module according to the driving control information. Here, the driving control information includes information of increasing or decreasing an output current.

The driving unit 260 includes a current controlling unit 261 and an output unit 262. The current controlling unit 261 adds and subtracts an amount of the output current according to the driving control information. The output unit 262 drives a corresponding module by using the added and subtracted output current.

The single line interface apparatus 200 enables and disables an interface, and controls an output level supplied into a corresponding module in an enable state by three states of a control signal.

The corresponding module of the present invention can be a display module and a light unit including at least one LED or CCFL in the display module. Luminance or brightness can be controlled by adding and subtracting a current supplied into an LED of the light unit.

FIG. 3 is a block diagram of an applied example of an interface apparatus according to an embodiment of the present invention. Referring to FIG. 3, an interface apparatus 2 00 is connected to a central processing unit 100 in a single line. When a control signal is received from the central processing unit 100, the interface apparatus 200 controls operations of a display module 300 by decoding the control signal for enable/disable and counting up or down at each pulse of the control signal.

The interface apparatus 200 controls operations of an LCD panel in the display module 300, on/off of the light unit, and brightness by using a control signal inputted in a single line.

Moreover, a signal generating unit 110 may be realized in the central processing unit 100 as illustrated in FIG. 4. The signal generating unit 110 converts a control signal of the display module 300 into three states of a pulse signal.

A parameter detecting unit 101 outputs information for controlling of the display module 300 to the central processing unit 100. The parameter detecting unit 101 detects parameters such as surrounding brightness of a display module, a display mode, and various key signals related to the display module to output the parameters into the central processing unit 100. Accordingly, the central processing unit 100 outputs a control signal reflecting the parameters detected in the parameter detecting unit 101 through the signal generating unit 110. Moreover, the interface apparatus 200 can be mounted in the central processing unit 100. In this case, the central processing unit 100 directly controls operations of a display module.

FIG. 7 is a flowchart illustrating an interface method according to an embodiment of the present invention. Referring to FIG. 7, an interface apparatus receives a control signal in operation S101, and a level of the received control signal is detected in operation S103.

When determining whether there is a level change of the detected control signal or not in operation S105, the interface apparatus operates in an enable or disable state if there is no change in operation S107. At this point, the interface apparatus operates in a disable state when the level of the control signal is in a low voltage, and operates in an enable state when the level of the control signal is in a middle voltage or a high voltage.

According to a result of the operation S105, a counter unit counts up or down when there is a level change during one period of the control signal in operation S109. In operation S111, a final count value is outputted after being compared with a previous count value.

The up/down count operation is performed when the interface apparatus is in an enable state.

Here, the up count operation is performed when a rising edge of a pulse has a level shift changing from a low voltage into a middle voltage, and the down count operation is performed when a rising edge of a pulse has a level shift changing from a low voltage into a high voltage.

The count value reflects a count value changed from the previous count value by adding and subtracting the up/down count value to/from the previous count value to output a final count value. That is, when the previous up-count value is 50 and the current up-count value is 5, the final count value is 55, and when the previous up-count value is 50 and the current down-count value is 5, the final count value is 45.

When the final count value is outputted, a driving control information mapped into the counter value is searched in the storage unit and then outputted in operation S113. In operation S115, an output level of the driving unit increases or decreases according to the driving control information.

The single line interface apparatus controls a corresponding module using three states of a pulse control signal, therefore effectively performing complex control of a corresponding module.

INDUSTRIAL APPLICABILITY

According to the interface apparatus and method, a structure of the interface apparatus following a transmission and process standard can be simplified.

The single line interface apparatus performs a complex control of a corresponding module.

The single line interface apparatus effectively controls a corresponding module.

The single line interface apparatus connected in a single line reduces the number of input/output terminals, and also minimizes the size of IC.

The invention claimed is:

1. An interface apparatus comprising:

a level detecting unit detecting a level of an inputted control signal and outputting one of an enable signal and a disable signal according to a level of the control signal;

a counter unit increasing or decreasing a count value according to the level detected in the level detecting unit; and a driving control unit outputting a driving control information mapped into a count value of the counter unit, wherein the counter unit comprises:

an up-counter increasing a count value when a level of the control signal changes from a low voltage into a middle voltage during one period; and a down-counter decreasing a count value when a level of the control signal changes from a low voltage into a high voltage during one period.

2. The interface apparatus according to claim 1, wherein the level detecting unit outputs one of the enable signal and the disable signal according to a DC level of the control signal.

3. The interface apparatus according to claim 1, wherein the control signal comprises a pulse signal having three states of a level.

4. The interface apparatus according to claim 1, comprising an input unit receiving the control signal from a central processing unit in a single line to output a signal into the level detecting unit.

5. The interface apparatus according to claim 4, wherein the central processing unit comprising a pulse signal generating unit generating the control signal having three states of a level.

6. The interface apparatus according to claim 1, wherein the counter unit comprises a count comparator adding and subtracting a value counted in one of the up-counter and the down-counter to/from a previous count value for outputting.

7. The interface apparatus according to claim 1, comprising a driving unit increasing or decreasing an output level supplied into a corresponding module by a driving control information of the driving control unit.

8. The interface apparatus according to claim 7, wherein the corresponding module comprises one of a display module and a light unit.

9. The interface apparatus according to claim 8, wherein the light unit comprises at least one light emitting diode or cold cathode fluorescent lamp.

10. The interface apparatus according to claim 1, wherein the driving control unit reflects a value counted in the counter unit on a previous count value to map the value into the driving control information.

11. The interface apparatus according to claim 1, comprising a storage unit having the driving control information mapped into the count value.

12. An interface method comprising:

detecting a level of an inputted control signal;

outputting one of an enable signal and a disable signal according to a level of the control signal;

increasing or decreasing a count value according to a level of the detected control signal for outputting; and outputting as a driving control information of a corresponding module mapped into the outputted count value, wherein the count value increases by one when a level state of the control signal changes from a low voltage into a middle voltage during one period, and decreases by one when a level state of the control signal changes from a low voltage into a high voltage during one period.

13. The interface method according to claim 12, wherein the control signal is inputted in a single line.

14. The interface method according to claim 12, wherein the control signal comprises a pulse signal having three states of a level.

15. The interface method according to claim 12, wherein the detecting of the level comprises operating in a disable state when the level of the control signal is in a low voltage, and operating in an enable state when the level of the control signal is in one of a middle voltage and a high voltage.

16. The interface method according to claim 12, wherein the increased or decreased count value is added and subtracted to/from a previous count value to map into the driving control information.

17. The interface method according to claim 12, comprising increasing or decreasing an output level supplied into at least one light emitting diode or cold cathode fluorescent lamp according to the driving control information in an enable state.

18. An interface method comprising:

confirming a level state of a control signal inputted in a single line;

enabling or disabling an apparatus according to the level of the control signal;

increasing a count value when a level state of the control signal changes from a low voltage into a middle voltage, and decreasing a count value when a level state of the control signal changes from a low voltage into a high voltage; and outputting a driving control information mapped into the increased or decreased count value.

* * * * *